United States Patent [19]
Edler

[11] Patent Number: 5,214,742
[45] Date of Patent: May 25, 1993

[54] METHOD FOR TRANSMITTING A SIGNAL

[75] Inventor: Bernd Edler, Hanover, Fed. Rep. of Germany

[73] Assignee: TELEFUNKEN Fernseh und Rundfunk GmbH, Hanover, Fed. Rep. of Germany

[21] Appl. No.: 585,127
[22] PCT Filed: Jan. 26, 1990
[86] PCT No.: PCT/EP90/00143
§ 371 Date: Oct. 1, 1990
§ 102(e) Date: Oct. 1, 1990
[87] PCT Pub. No.: WO90/09063
PCT Pub. Date: Aug. 9, 1990

[30] Foreign Application Priority Data

Feb. 1, 1989 [DE] Fed. Rep. of Germany ....... 3902948

[51] Int. Cl.$^5$ .............................................. G10L 3/02
[52] U.S. Cl. .................. 395/2; 364/724.01; 381/36
[58] Field of Search ........................ 364/724.01, 513.5; 381/29–50; 395/2

[56] References Cited

U.S. PATENT DOCUMENTS

| 4,815,135 | 3/1989 | Taguchi | 381/37 |
| 4,885,790 | 12/1989 | McAulay et al. | 381/36 |
| 4,951,266 | 8/1990 | Hsu | 364/724.01 |
| 5,042,069 | 8/1991 | Chhatwal et al. | 381/29 |

FOREIGN PATENT DOCUMENTS 3506912 8/1986 Fed. Rep. of Germany.

OTHER PUBLICATIONS

Hamming, *Digital Filters, Second Edition*, 1983 by Prentice-Hall, Inc., Chapter 5, "Windows", pp. 90–108.
IEEE Transactions on Acoustics Speech, and Signal Processing, vol. 34, No. 5, Oct. 1986, John P. Princen, et al, "Analysis/Synthesis Filter Bank Design Based on Time Domain Aliasing Cancellation", pp. 1153–1161.

*Primary Examiner*—David D. Knepper
*Attorney, Agent, or Firm*—Spencer, Frank & Schneider

[57] ABSTRACT

Transmitting a signal wherein the signals is segmented by means of windows into successive overlapping blocks, the partial signals contained in the blocks are converted by transformation into a spectrum, with the spectra then being coded, transmitted, decoded after transmission and converted back into partial signals by retransformation. Finally, the blocks containing the partial signals are joined in an overlapping manner, with the overlapping regions of the blocks being weighted such that the resultant of the window functions in the respective overlapped regions equals one. To 2.2. In order to avoid interferences in adjacent blocks upon changes in the signal amplitude, the length of the window functions is selected as a function of signal amplitude changes. The method is suitable for the treatment of audio and video signals which are subjected to data reduction during transmission.

9 Claims, 3 Drawing Sheets

METHOD FOR TRANSMITTING A SIGNAL

BACKGROUND OF THE INVENTION

The invention relates to a method of transmitting a signal wherein the signal is divided into successive, overlapping blocks by means of windows, the partial signals contained in the blocks then are converted into a spectrum by transformtion, the spectra subsequently are coded, transmitted, decoded after transmission, converted back into partial signals by inverse transformation, and finally the blocks containing the partial signals are joined in an overlapping manner, and wherein the overlapping regions of the blocks are weighted such that the resultant of the window functions in the respective overlapped regions equals 1.

In connection with the transmission of an audio signal, for example, radio transmission, cable transmission, satellite transmission and in connection with recording devices, it is known to convert the analog audio signal into a digital audio signal having a certain resolution to transmit the signal in this form, and to then convert the digital signal back into an analog signal for reproduction. The digital transmission results in a better signal to noise ratio, particularly for reproduction.

The bandwidth required for the transmission of such a signal is essentially determined by the number of sampling values to be transmitted per unit time and by the resolution.

In practice, the requirement exists to keep the required transmission bandwidth as small as possible so as to be able to use a narrowband channel or to transmit as many audio signals as possible simultaneously over an existing channel. The required bandwidth can be reduced by a reduction of the sampling values or the number of bits per sampling value.

However, the consequence of this measure is, as a rule, a deterioration of the reproduction. In a known method (DE OS 35 06 912.0) the reproduction quality is improved in that the digital audio signal is transformed in successive time segments into a short-time spectrum which represents the spectral components of the signal for the respective time segment of, for example, 20 ms. On the basis of psycho-acoustic laws, components which are not perceived by the listener, that is, those which are irrelevant for communications purposes, can generally be found more easily in the short-time spectrum than in the time domain. These components are given less weight or are omitted entirely in transmission. With this measure, a considerable portion of the otherwise necessary data can be omitted from the transmission so that the average bit rate can be markedly reduced.

A method described by J.P. Princen and A.B. Bradley in an article, entitled "Analysis/Synthesis Filter Bank Design Based On Time Domain Aliasing Cancellation", in *IEEE Transactions on Acoustics, Speech and Signal Processing,* Volume ASSP-34, pages 1153 to 1161, October, 1986, is suitable for dividing the signal into segments. Here a transformation is described in which overlapping blocks are produced in the frequency domain with rounded-off window functions in the windows without additional coefficients. In this method, N values are first cut out of the input signal with the aid of a window function f(n) of a length N, an<then transformed into N/2 significant coefficients in the frequency domain. The retransformation calculates N sampling values from the N/2 coefficients which are in turn weighted with the window function f(n).

However, the output signal of the retransformation differs from the input signal of the original transformation. The exact reconstruction of the input signal becomes possible only in that the output values of successive retransformations are added in the overlapping region of every N/2 sampling values. In order to recover. The input signal by means of this so-called "overlap-add" method, the window function f(n) must meet the following conditions:

$$f(N - 1 - n) = f(n) \qquad 0 \leq n \leq N - 1 \qquad (1)$$

$$f^2(N/2 - 1 - n) + f^2(n) = 2 \quad 0 \leq n \leq N/2 - 1 \qquad (2)$$

The first condition corresponds to symmetry of f(n). The second condition corresponds to point symmetry of the square of f(n) in each window half. Under consideration of these conditions, the effective window length of the transformation can be varied between N/2 and N sampling values.

When using these methods in transformation coders, the selection of the window length leads to the following consequences. A long window length with, preferably, a rounded-off form permits good frequency selectively. Thus, the retransformation, the error is expanded over the entire effective window length due to the quantization of the coefficients. This can have a negative effect on the subjective quality of the coded signal, particularly with large jumps in the amplitude of the signal to be coded.

The selection of shorter windows causes a deterioration of the frequency selectivity, which has a negative effect on the transformation gain to be attained, particularly with strongly correlated input signals. On the other hand, the errors can be limited to the respective window by quantization of the coefficients during large signal jumps so that their affecting the adjacent windows can be prevented.

SUMMARY OF THE INVENTION

It is the object of the invention to improve a method of the above described type for transmitting a signal in such a way that optimum frequency selectivity and high subjective quality of the coded and decoded signal is achieved.

The above object is generally achieved according to the invention by a method of transmitting a signal of the above described type wherein the signal is divided into successive, overlapping blocks by means of windows, the partial signals contained in the blocks then are converted into a spectrum by transformation, the spectra are coded, subsequently transmitted, decoded after transmission and converted back into partial signals by inverse transformation, and finally the blocks containing the partial signals are joined in an overlapping manner, with the overlapping regions of the blocks being weighted such that the resultant of the window functions in the respective overlapping regions equals 1; and wherein the length of the respective window functions is selected as a function of signal amplitude changes.

In a further development the window functions of a subsequent window in the region of overlap with the leading window are formed by imaging the window functions of the leading window existing in this region. In this way, an even better adjustment to fast changing signals is achieved. With the window function described above it was still assumed that the same window functions are used for all transformations. However, if one assumes the use of different window functions, for example, f(n) and g(n), in successive blocks, it is found that Relationships (1) and (2) refer only to the region in which the two halves of the windows overlap:

$$f(N - 1 - n) = g(n) \qquad 0 \leq n \leq N/2 - 1 \qquad (3)$$

$$f^2(N/2 + n) + g^2(n) = 2 \qquad 0 \leq n \leq N/2 - 1 \qquad (4)$$

In this case, both equations relate only to the second half of function f and the first half of function g. Therefore, the window halves of a block can be selected independently of each other if they fulfill Equations (3) and (4) only together with the corresponding window halves of the adjacent blocks.

BRIEF DESCRIPTION OF THE DRAWINGS

The method according to the invention will be described with reference to the drawings wherein.

DETAILED DESCRIPTION OF THE PREFERRED EMBODIMENTS

Figure 1A:
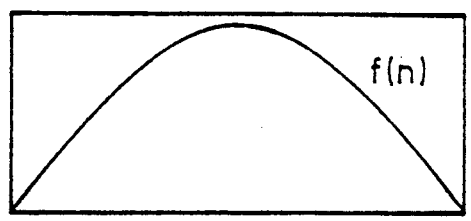
FIGS. 1a-1c show respective window functions of differing lengths or widths.
Figure 1B:
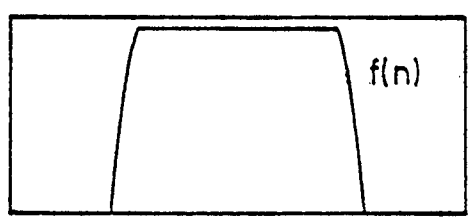
Figure 1C:
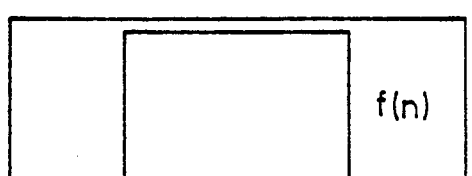

FIG. 1 shows several windows of a constant width or length with different window functions f(n). The windows are always joined together in such a way that adjacent windows overlap one another by half. Thus, a one-half overlap also results with the sinusoidal window function f(n) of FIG. 1a; a partial overlap amounting to less than half results with the illustration of a window function according to FIG. 1b; and in FIG. 1c the two sides of the window function f(n) merely contact one another.

Figure 2:
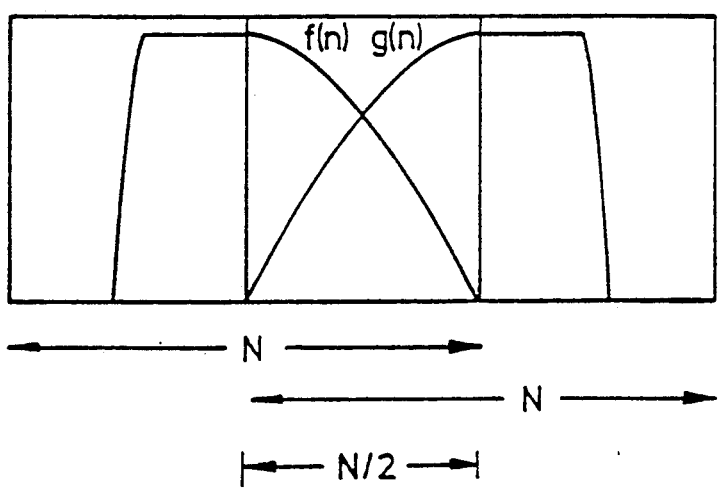
FIG. 2 shows asymmetric overlapping window functions.

FIG. 2 shows the superposition of two windows with asymmetric window functions f(n) and g(n). However, in their common overlapping regions, two window functions are configured in such a way that their resultants supplement one another to equal 1. That is, as shown, the overlapping portions of the two window functions are images of one another.

Figure 3A:
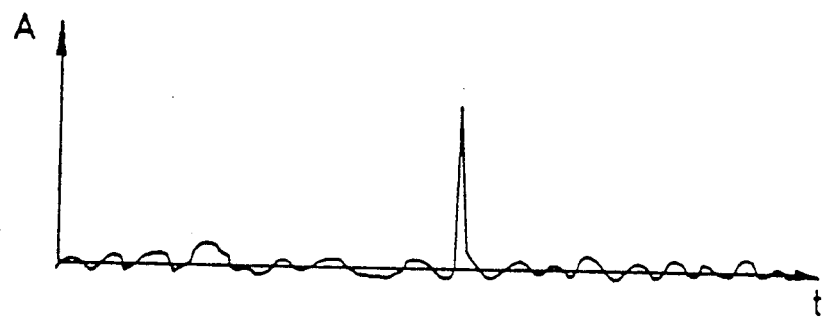
FIG. 3a shows the course of an input signal.
Figure 3B:
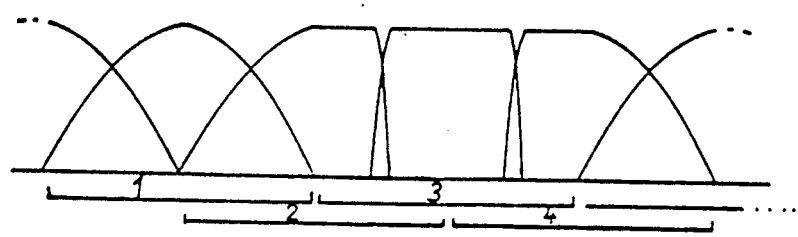
FIG. 3b shows a window function sequence which is adapted to the input signal of FIG. 3a according to the invention.

FIG. 3a shows the curve of an amplitude A(t) of an input signal. As can be seen, the signal first has a uniform, low amplitude which is followed by a signal jump whereupon the original amplitude continues. Below it, FIG. 3b shows the window functions of the windows with which this signal can be optimally processed according to the invention. The first region including window 1 has sinusoidal window functions which permit high frequency selectivity. On the other hand, window 3, into which falls the signal portion with the high amplitude, has a very narrow window function i.e., a narrow window function like that shown in FIG. 1b. The window functions of the adjacent windows 2 and 4, that is, the preceding and the subsequent windows, have a correspondingly adapted window function in the overlapping regions, so that the window functions in these overlapping regions supplement one another to equal 1. That is, the window function for the window 2 has a leading portion which is the image of the overlapped portion of the window function (sinusoidal) for the window 1, and a trailing portion which is the image of the overlapped portion of the narrow window function for the window 3. The window function for window 4 is similar to that of window 2 but has reversed leading and trailing portions, i.e., it is an image of the window function of window 2. Therefore, the window functions in both these adjacent windows 2 and 4 have an appear within window 3, in which the signal jump lies, are thus limited to the domain of the window functions of window 3 and are therefore reduced to half the expanse in time compared with, for example, a window function having a sinusoidal curve as shown in FIG 1a. A subjective improvement of the audio quality results from the masking effect of the signal jump despite the reduced frequency selectivity.

To achieve the sequence of window functions shown in FIG. 3b, each of the four different window functions shown in that figure (which correspond to the winding functions shown in FIGS. 1a, 1b and 2) is defined and stored, and upon detection of a signal jump or change in amplitude of a given magnitude, the window function of successive windows (2,3) are selected to have shortened lengths (while still satisfying the overlap region criteria) until the narrow window (3) containing the signal jump is reached. Thereafter, window functions with increasing lengths are successively selected until the normal maximum length window function, e.g. The sinusoidal full window length window function, is selected. An index which defines the particular window function should be transmitted together with the respective coded spectrum.

Figure 4:
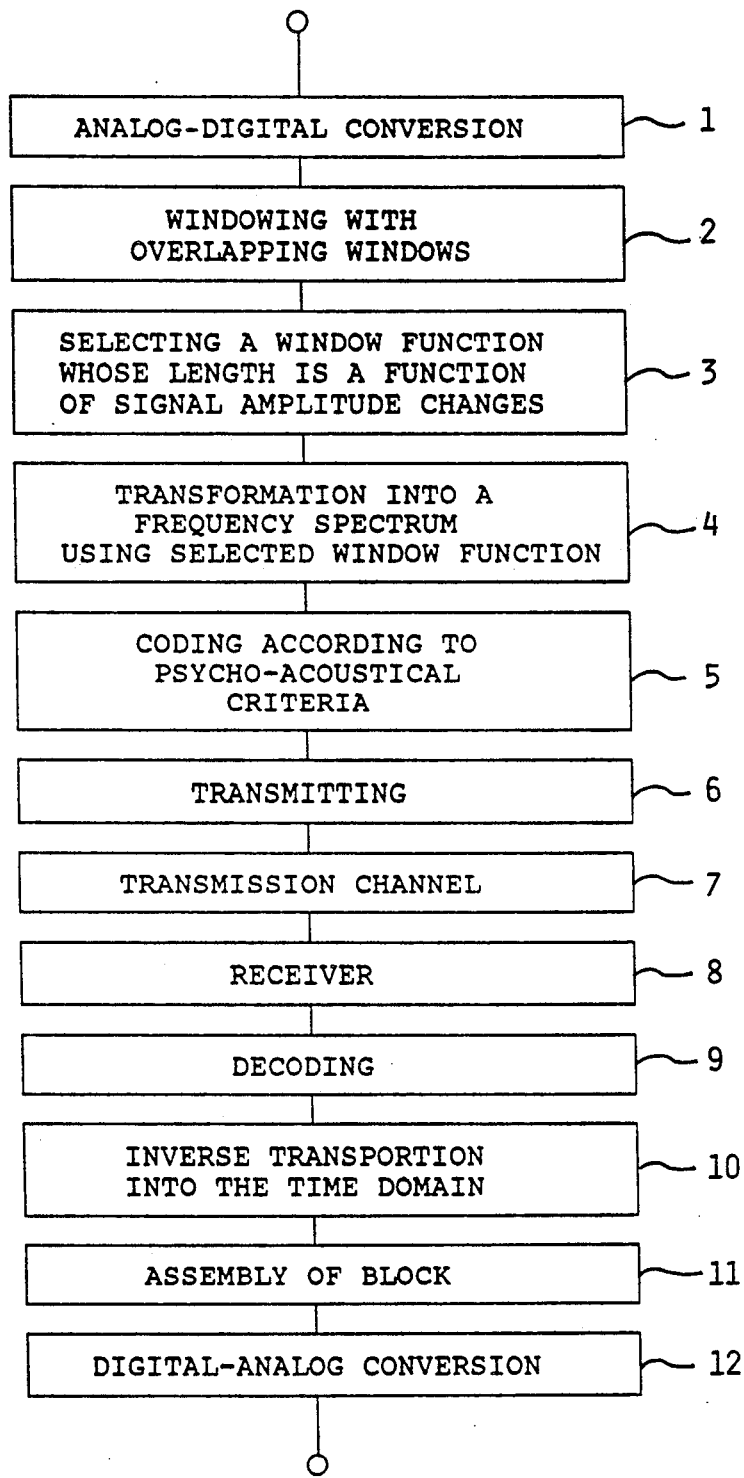
FIG. 4 is a flow diagram for the basic steps of the method according to the invention.

Referring now to FIG. 4, there is shown the basic flow diagram for the method according to the invention. As shown in this Figure, the analog input signal a(t), which preferably represents an audio signal such as speech or music, is converted to a corresponding digital signal in a first processing step 1. Thereafter, in a step marked 2, the digital signal is divided into a plurality of overlapping blocks are each containing a partial signal. As indicated above, in the preferred embodiment of the invention, the individual blocks are of constant length N with successive blocks overlapping by one half i.e. N/2. Thereafter, in step 3, window functions are selected for the respective windows or blocks, with the lengths of the respective window functions being a function of amplitude changes in the signal being processed. As indicated above, this can be accomplished by monitoring the amplitude of the input signal, and utilizing a window function with a narrow or reduced length if a signal amplitude change of sufficient magnitude is detected. As further indicated above, the window functions utilized according to the invention are such that in the overlapping regions of successive blocks, the resultant of the window functions is equal to 1. Accordingly, in order to optimize the adaptation of the window functions to the signal being processed, the signal is normally processed with a wide window function e.g., the full length sinusoidal function of FIG. 1a, while a very narrow window function e.g., the window function of FIG. 1b, is utilized for the location of the abrupt amplitude change or jump, and thus an asymmetrical window function meeting the criteria of equations (3) and (4) in the respective overlapping regions is provided between the normal or long length window function and the narrow or short length window function.

Thereafter, in a step 4, the digital signal is transformed into the frequency spectrum or domain using the selected window functions and the transformed spectra are coded according to well known psycho acoustical criteria (step 5) and fed to a transmitter for transmission (step 6) via a transmission channel indicator of 7.

The transmitted signal is in turn received by a receiver (step 8), decoded (step 9), and subjected to an inverse transformation into the time domain utilizing the same window functions as were used during the transformation (step 10). Thereafter, the blocks containing the partial signals resulting from the inverse transformation are assembled or joined in an overlapping manner (step 11) and finally the signal is subjected to a digital to analog conversation (step 12) to provide the analog output signal b(t). With the exception of step 3 of selecting the window functions, which may be carried out in any desired form readily available to one skilled in the art, the other steps of method correspond to the basic method disclosed in the above-identified German reference for transmitting a signal but utilizing the windowing and transformation technique disclosed in the above-identified article by Pricen et al is utilized.

The invention is not limited to audio signals. They may also be video signals. Successive blocks may also follow one another, for example, in spatial instead of time intervals.

I claim:

1. In a method of transmitting a signal including the steps of dividing the signal into successive, overlapping blocks by means of windows, converting the partial signals contained in the blocks into a spectrum by transformation utilizing window functions within the respective said windows such that the resultant of the window functions in the respective overlapping regions of successive blocks equals 1, subsequently, coding and transmitting the resulting spectra, receiving and decoding the transmitted coded spectra, converting the decoded spectra back into partial signals by transformation, and finally, joining the blocks containing the partial signals in an overlapping manner; the improvement comprising selecting the length of the respective window functions as a function of signal amplitude changes.

2. A method according to claim 1, wherein the windows are spaced at constant distances, and said step of selecting includes selecting window functions whose effective length in comparison with the length of the windows is a function of the signal amplitude changes.

3. A method according to 2, wherein said step of selecting includes selecting the length of the window functions to be small for large signal changes and large for small signal changes.

4. A method according to claim 3, wherein the window functions utilized are such that the window function of a subsequent window in the region where it overlaps with the leading window is formed by imaging the window function present in this region in the leading window.

5. A method according to claim 4, wherein said step of selecting includes providing a set of defined differing window functions with different length, and using a window function from the set each time as a function of the signal changes; and further comprising transmitting, during the transmission step, an index which clearly defines the respective given window function.

6. A method according to claim 2 wherein the windows overlap by one-half the length of the windows.

7. A method according to claim 1, wherein said step of selecting includes changing the spacing of the windows as a function of signal amplitude changes.

8. A method according to claim 1, wherein the signals are subjected to changes in time.

9. A method according to claim 8 wherein the signals are audio signals.

* * * * *

UNITED STATES PATENT AND TRADEMARK OFFICE
CERTIFICATE OF CORRECTION

PATENT NO. : 5,214,742
DATED : May 25, 1993
INVENTOR(S) : ELDER

It is certified that error appears in the above-indentified patent and that said Letters Patent is hereby corrected as shown below:

Column 4, line 11, after "an" insert --asymmetrical shape, Quantizing disturbances which would--.

Signed and Sealed this

Twenty-fifth Day of July, 1995

BRUCE LEHMAN

Attest:

Attesting Officer

Commissioner of Patents and Trademarks